US011662917B1

(12) United States Patent
Banin et al.

(10) Patent No.: US 11,662,917 B1
(45) Date of Patent: May 30, 2023

(54) SMART DISK ARRAY ENCLOSURE RACE AVOIDANCE IN HIGH AVAILABILITY STORAGE SYSTEMS

(71) Applicant: Dell Products L.P., Round Rock, TX (US)

(72) Inventors: Eran Banin, Tel Aviv (IL); Leonid Ravich, Yatzitz (IL); Omer Margolin, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/708,287

(22) Filed: Mar. 30, 2022

(51) Int. Cl.
*G06F 3/06* (2006.01)

(52) U.S. Cl.
CPC ............ *G06F 3/0619* (2013.01); *G06F 3/067* (2013.01); *G06F 3/0617* (2013.01); *G06F 3/0659* (2013.01); *G06F 3/0689* (2013.01)

(58) Field of Classification Search
CPC .... G06F 3/0619; G06F 3/0617; G06F 3/0659; G06F 3/067; G06F 3/0689
See application file for complete search history.

(56) References Cited

U.S. PATENT DOCUMENTS

| | | |
|---|---|---|
| 7,424,554 B1 | 9/2008 | Sardella et al. |
| 9,304,581 B1 | 4/2016 | Robillard |
| 11,061,618 B1 | 7/2021 | Glimcher et al. |
| 11,079,969 B1 | 8/2021 | Glimcher et al. |
| 11,113,178 B2 | 9/2021 | Bryan |
| 11,281,386 B2 | 3/2022 | Glimcher et al. |
| 2017/0242745 A1* | 8/2017 | Sherlock ............. G06F 11/1076 |
| 2018/0060231 A1* | 3/2018 | Kelly .................. G06F 11/1441 |

* cited by examiner

*Primary Examiner* — Jason W Blust
(74) *Attorney, Agent, or Firm* — BainwoodHuang

(57) ABSTRACT

Techniques for avoiding race conditions in high availability (HA) storage systems that employ disk array enclosures (DAEs). The techniques include receiving a notification of an input/output (IO) error from a storage node, in which the IO error occurs subsequent to the storage node issuing, to a first DAE controller, an IO operation to access data at a logical address of a storage device. The techniques further include, in response to the notification of the IO error, issuing, over an out-of-band channel, a flush command to the first DAE controller, causing data stored in cache memory of the first DAE controller to be written to the storage device, and receiving, over the out-of-band channel, an acknowledgement of completion of the flush operation from the first DAE controller. The techniques further include sending a notification of the completion of the flush operation to the storage node.

20 Claims, 5 Drawing Sheets

SMART DISK ARRAY ENCLOSURE RACE AVOIDANCE IN HIGH AVAILABILITY STORAGE SYSTEMS

BACKGROUND

Storage systems include multiple storage nodes to assure high availability of storage applications and/or services. The storage nodes include storage processing circuitries that service storage input/output (IO) requests generated by host computers coupled to the storage systems. The storage IO requests (e.g., write requests, read requests) specify data blocks, data pages, data files, or other data elements to be written to or read from volumes (VOLs), logical units (LUNs), filesystems, or other storage objects maintained on storage devices such as solid-state drives (SSDs), hard disk drives (HDDs), optical drives, and so on. The storage devices may be enclosed within disk array enclosures (DAEs), which may include multiple DAE controllers coupled to the storage devices for high availability.

SUMMARY

In a high availability (HA) storage system, a storage node can service write requests generated by host computers to write data elements (e.g., data blocks) to logical block addresses (LBAs) of storage devices within a disk array enclosure (DAE). While servicing a write request, the storage node can issue, to a DAE controller of the DAE, an IO operation (e.g., a write operation) that includes a data block to be written to an LBA of a storage device. Having been issued the write operation, the DAE controller can store the data block at the LBA of the storage device and return, to the storage node, an acknowledgement of completion of the write operation once the data block has been successfully stored.

Such operation of an HA storage system can be problematic, however, particularly when faced with an HA event such as a cable disconnection, a storage node reboot, an IO timeout, and so on. For example, after a storage node has issued, to a first DAE controller of a DAE, a write operation corresponding to a write request specifying a data block to be written to an LBA of a storage device, an HA event such as a cable disconnection may occur between the storage node and the first DAE controller, preventing an acknowledgement of completion of the write operation to be returned to the storage node. As a result, the storage node may be unaware of a current state of the write operation, e.g., whether the write operation has been "completed" or is still "in-flight." Further, in response to the cable disconnection, an IO error may be returned to an application layer of the storage node, causing the storage node to issue, to a second DAE controller of the DAE, a subsequent write operation specifying a data block to be written to the LBA of the storage device. However, if the current state of the prior write operation issued to the first DAE controller is "in-flight," a race condition may occur involving the prior write operation and the subsequent write operation issued to the second DAE controller. For example, the prior write operation to the LBA of the storage device may be completed after the completion of the second write operation to the same LBA of the storage device, resulting in possible corruption of the data block stored at the LBA.

Techniques are disclosed herein for avoiding race conditions in high availability (HA) storage systems that employ disk array enclosures (DAEs). In the disclosed techniques, an HA storage system can include multiple storage nodes and a DAE, which can include multiple DAE controllers and a least one storage device. The HA storage system can further include a management component configured to receive notifications of IO errors and, in response to the IO error notifications, to issue flush commands to the DAE controllers, as appropriate, to avoid race conditions involving write operations to the storage device. The disclosed techniques can include receiving, at the management component, a notification of an IO error from a storage node, in which the IO error occurs subsequent to the storage node issuing, to a first DAE controller of the DAE, a first write operation to write a data block to an LBA of the storage device. The disclosed techniques can further include, in response to the notification of the IO error, issuing, by the management component over an out-of-band communication channel, a flush command to the first DAE controller, causing data blocks stored or cached in cache memory of the first DAE controller to be written to the storage device. The disclosed techniques can further include receiving, at the management component over the out-of-band communication channel, an acknowledgement of completion of the flush operation from the first DAE controller, and sending, by the management component, a notification of the completion of the flush operation to the storage node. Because, in response to the flush operation, data blocks are flushed from the cache memory of the first DAE controller to the storage device, the storage node can issue, to a second DAE controller of the DAE, a second write operation to write a data block to the same LBA of the storage device, while avoiding a potential race condition involving the first write operation.

In certain embodiments, a method of avoiding race conditions in a high availability (HA) storage system includes receiving, at a management entity of a storage appliance, a notification of an input/output (IO) error occurring on a communications path that includes a disk array enclosure (DAE) controller of a DAE. The IO error occurs subsequent to a storage node of the storage appliance issuing, to the DAE controller, an IO operation to access data at a logical address of a storage device. The method further includes, in response to the notification of the IO error, issuing, by the management entity, a flush command over an out-of-band channel to the DAE controller to cause data stored in cache memory of the DAE controller to be written to the storage device, and receiving, at the management entity, an acknowledgement of completion of the flush operation over the out-of-band channel from the DAE controller. The method further includes sending, by the management entity, a notification of the completion of the flush operation to the storage node.

In certain arrangements, the method further includes, in response to the notification of the completion of the flush operation, returning a second notification of the IO error to an application layer of the storage node.

In certain arrangements, the method further includes, in response to the second notification of the IO error being returned to the application layer of the storage node, issuing a second IO operation by the storage node to a second DAE controller of the DAE to access the data at the logical address of the storage device.

In certain embodiments, a method of avoiding race conditions in a high availability (HA) storage system includes sending, by a storage node of a storage appliance to a management entity of the storage appliance, a notification of an input/output (IO) error on a communications path that includes a disk array enclosure (DAE) controller of a DAE. The IO error occurs subsequent to the storage node issuing, to the DAE controller, an IO operation to access data at a logical address of a storage device. The method further includes, in response to the notification of the IO error, issuing, by the management entity, a flush command to the DAE controller over an out-of-band channel to cause data stored in cache memory of the DAE controller to be written to the storage device, and receiving, at the management entity, an acknowledgement of completion of the flush operation over the out-of-band channel from the DAE controller. The method further includes receiving, at the storage node from the management entity, a notification of the completion of the flush operation, and, in response to the notification of the completion of the flush operation, returning a second notification of the IO error to an application layer of the storage node.

In certain arrangements, the method further includes, in response to the second notification of the IO error being returned to the application layer, issuing, by the storage node, a second IO operation to a second DAE controller of the DAE to access the data at the logical address of the storage device.

In certain embodiments, a high availability (HA) storage system includes a storage appliance including a first storage node, a second storage node, and a management component; a disk array enclosure (DAE) including a first DAE controller and a second DAE controller; and a storage device. The storage appliance is configured to execute the management component to receive a notification of an input/output (IO) error occurring on a communications path that includes the first DAE controller. The IO error occurs subsequent to a respective storage node from among the first storage node and second storage node issuing an IO operation to the first DAE controller to access data at a logical address of the storage device. The storage appliance is further configured to execute the management component, in response to the notification of the IO error, to issue a flush command to the first DAE controller over an out-of-band channel to cause data stored in cache memory of the first DAE controller to be written to the storage device, and to receive an acknowledgement of completion of the flush operation over the out-of-band channel from the first DAE controller. The storage appliance is further configured to execute the management component to send a notification of the completion of the flush operation to the respective storage node.

In certain arrangements, the respective storage node is configured to issue the IO operation to the first DAE controller to access the data at the logical address of the storage device.

In certain arrangements, the respective storage node is configured, in response to the notification of the completion of the flush operation, to return a second notification of the IO error to an application layer of the respective storage node.

In certain arrangements, the respective storage node is further configured, in response to the second notification of the IO error being returned to the application layer, to issue a second IO operation to the second DAE controller to access the data at the logical address of the storage device.

In certain arrangements, the first DAE controller is configured to receive the flush command over the out-of-band channel.

In certain arrangements, the first DAE controller is further configured, in response to the flush command, to write the data stored in its cache memory to the storage device.

In certain arrangements, the first DAE controller is further configured to send the acknowledgement of the completion of the flush operation over the out-of-band channel to the management controller.

In certain arrangements, the storage device is configured as a solid-state drive (SSD).

In certain arrangements, the out-of-band channel is configured as a secure shell (SSH) session between the storage appliance and the first DAE controller.

In certain arrangements, the IO error corresponds to a cable disconnection between the respective storage node and the first DAE controller.

In certain arrangements, the IO error corresponds to a reboot of the respective storage node.

In certain arrangements, the first DAE controller and the second DAE controller are configured to communicate with the storage device in an IO session.

In certain arrangements, the first DAE controller and the second DAE controller are configured to communicate with the storage device in the IO session using a Non-Volatile Memory express Over Fabrics (NVMeOF) networking protocol.

In certain arrangements, the IO error corresponds to an IO timeout error.

In certain arrangements, the storage appliance is further configured to execute the management component, in response to receipt of the notification of the IO timeout error, to issue a command over the out-of-band channel to the first DAE controller to take down the IO session between the first DAE controller and the storage device.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

DETAILED DESCRIPTION

Techniques are disclosed herein for avoiding race conditions in high availability (HA) storage systems that employ disk array enclosures (DAEs). In one embodiment, the disclosed techniques can include receiving a notification of an IO error from a storage node, in which the IO error occurs subsequent to the storage node issuing, to a first DAE controller of a DAE, a first IO operation to access data at a logical address of a storage device. The disclosed techniques can further include, in response to the notification of the IO error, issuing, over an out-of-band communication channel, a flush command to the first DAE controller, causing data stored in cache memory of the first DAE controller to be written to the storage device, and receiving, over the out-of-band communication channel, an acknowledgement of completion of the flush operation from the first DAE controller. The disclosed techniques can further include sending a notification of the completion of the flush operation to the storage node. Because data are flushed from the cache memory of the first DAE controller to the storage device in response to the flush operation, the storage node can now issue, to a second DAE controller of the DAE, a second IO operation to access data at the logical address of the storage device, while avoiding a potential race condition involving the first IO operation.

Figure 1:
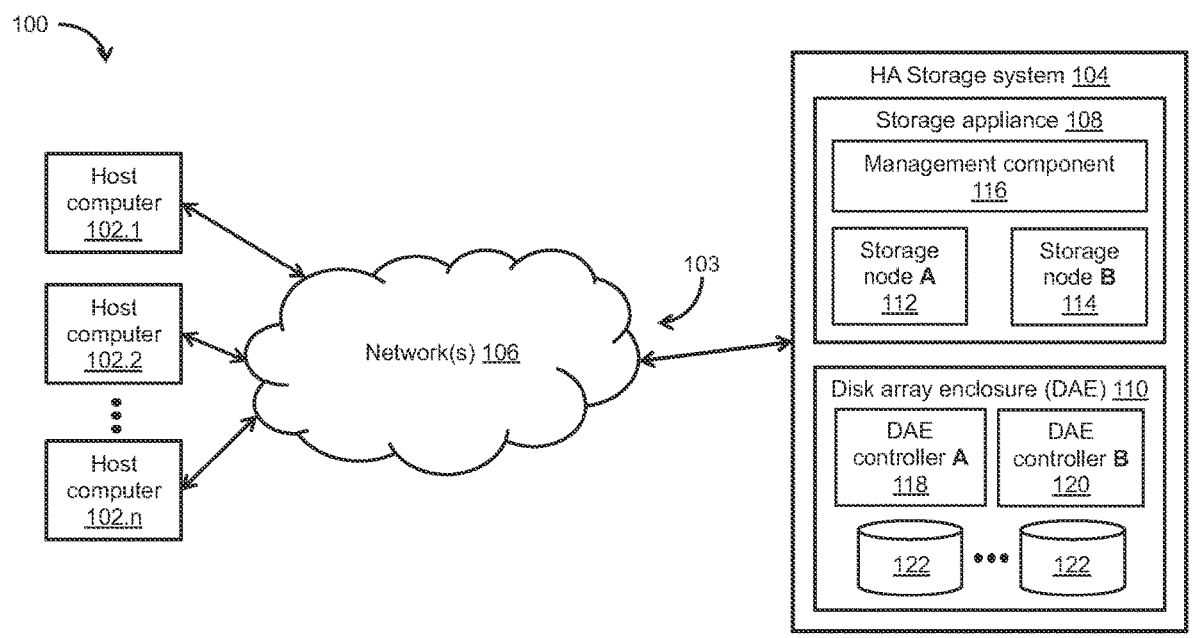
FIG. 1 is a block diagram of an exemplary storage environment, in which techniques can be practiced for avoiding race conditions in high availability (HA) storage systems that employ disk array enclosures (DAEs)

FIG. 1 depicts an illustrative embodiment of an exemplary storage environment 100, in which techniques can be practiced for avoiding race conditions in high availability (HA) storage systems that employ disk array enclosures (DAEs). As shown in FIG. 1, the storage environment 100 can include a plurality of host computers 102.1, 102.2, . . . , 102.n communicably coupled to an HA storage system 104 by a communications medium 103, which can include at least one network 106. For example, each of the plurality of host computers 102.1, . . . , 102.n can be configured as a file server, a web server, an email server, or any other suitable server computer, client computer, or computerized device. The HA storage system 104 can include a storage appliance 108, which can include multiple storage nodes (e.g., a storage node A 112, a storage node B 114), a management component 116, and a disk array enclosure (DAE) 110. The host computers 102.1, . . . , 102.n can be configured to provide storage input/output (IO) requests (e.g., small computer system interface (SCSI) commands, network filesystem (NFS) commands) over the network(s) 106 to the HA storage system 104. Such storage IO requests (e.g., write requests, read requests) can direct one or more of the storage nodes A 112, B 114 to write and/or read data blocks, data pages, data files, and/or any other suitable data elements to/from storage objects (e.g., volumes (VOLs), logical units (LUNs), filesystems) maintained on one or more storage devices 122 (e.g., solid-state drives (SSDs), hard disk drives (HDDs), optical drives) within the DAE 110. Such SSDs can be implemented using non-volatile memory (NVM) devices such as flash memory. Other types of NVM devices that can be used to implement at least a portion of the storage devices 122 include non-volatile random-access memory (NVRAM), phase-change RAM (PC-RAM), and magnetic RAM (MRAM). These and various combinations of multiple different types of NVM devices can also be used.

The communications medium 103 can be configured to interconnect the host computers 102.1, . . . , 102.n with the HA storage system 104 to enable them to communicate and exchange data and control signaling. As shown in FIG. 1, the communications medium 103 is illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

It is noted that the storage appliance 108 can include the multiple storage nodes (e.g., the storage node A 112, the storage node B 114) for high availability. For example, one of the storage nodes A 112, B 114 (e.g., the storage node A 112) can perform a role of primary storage node within the storage appliance 108, while the other one of the storage nodes A 112, B 114 (e.g., the storage node B 114) performs a role of secondary storage node within the storage appliance 108. As such, the (primary) storage node A 112 can receive IO requests from the plurality of host computers 102.1, . . . , 102.n over the network(s) 106, and, in response to the IO requests, write and/or read data blocks, data pages, data files, or other data elements to/from one or more volumes (VOLs), logical units (LUNs), filesystems, or other storage objects maintained on the storage device(s) 122 within the DAE 110. In the event of a failure of the (primary) storage node A 112, the (secondary) storage node B 114 can assume the duties of the (primary) storage node A 112, providing high availability within the storage environment 100. Each storage node A 112, B 114 can include storage processing circuitry, at least one memory (e.g., persistent memory, non-persistent cache memory), and a communications interface, which can be configured to connect the storage node A 112, B 114 to the network(s) 106, enabling access to/from the plurality of host computers 102.1, . . . , 102.n. Such access over the network(s) 106 can be SAN-based, Internet protocol (IP)-based, cellular-based, cable-based, fiber optic-based, cloud-based, wireless, and so on, or any suitable combination thereof. The storage appliance 108 can further include processing circuitry and at least one memory, which can be configured to store a variety of software constructs realized in the form of specialized code and data (e.g., program instructions) such as the management component 116. The processing circuitry of the storage appliance 108 can be configured to execute the management component 116 to carry out the various techniques, processes, and/or methods described herein. In one embodiment, the management component 116 is configured to be maintained and executed on one of the storage nodes A 112, B 114 and communicably coupled to each of the storage nodes A 112, B 114.

Figure 2:
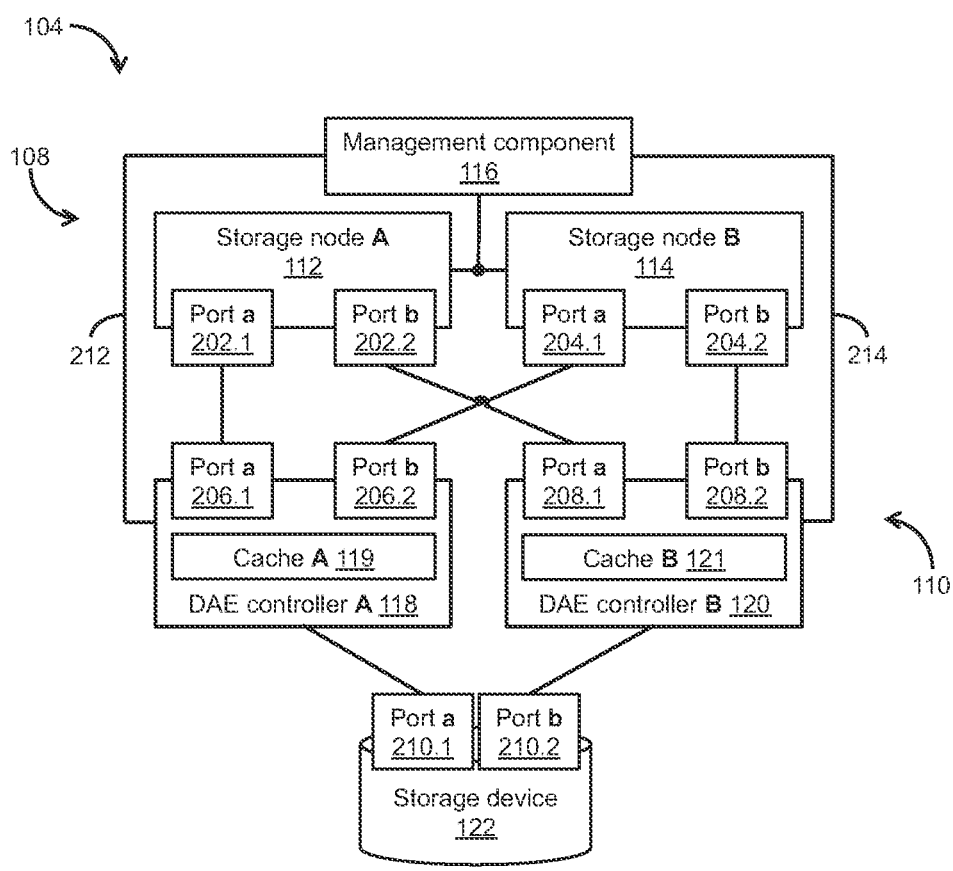
FIG. 2 is a block diagram of an exemplary storage appliance and an exemplary disk array enclosure (DAE) included in an HA storage system within the storage environment of FIG. 1, in which the storage appliance includes multiple storage nodes and the DAE includes multiple DAE controllers.

It is further noted that the DAE 110 can include multiple DAE controllers (e.g., a DAE controller A 118, a DAE controller B 120) for high availability. Each DAE controller A 118, B 120 can include processing circuitry, a local memory, and a cache memory (e.g., a cache memory A 119, a cache memory B 121; see FIG. 2). As employed herein, the term "disk array enclosure" or "DAE" is intended to be broadly construed so as to encompass an enclosure that includes any suitable form of memory and/or storage device(s) including storage class memory, flash drives, SSDs, HDDs, hybrid drives, or any other suitable storage devices. With reference to FIGS. 1 and 2, the DAE 110 can include the DAE controller A 118, the DAE controller B 120, the storage device(s) 122, and network devices configured to interconnect the DAE controllers A 118, B 120 with the storage device(s) 122. For example, such network devices can include PCIe switches or any other suitable network components that can facilitate communication between the DAE controllers A 118, B 120 and the storage device(s) 122. Such network devices can employ networking protocols such as InfiniBand, Gigabit Ethernet, Fibre Channel, Non-Volatile Memory express Over Fabrics (NVMeOF), NVMe/SCSI, or any other suitable protocol.

In the context of the processing circuitry of the storage appliance 108 executing specialized code (e.g., program instructions) out of a memory, a computer program product can be configured to deliver some or all of the program instructions stored in the memory to the processing circuitry. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the storage processing circuitry 110, the various techniques and/or methods disclosed herein.

FIG. 2 depicts another view of the HA storage system 104, including the storage appliance 108 and the DAE 110. As shown in FIG. 2, the storage node A 112 includes a port "a" 202.1 and a port "b" 202.2 for communicating with the DAE controller A 118 and the DAE controller B 120, respectively. The port a 202.1 of the storage node A 112 can be connected to a port "a" 206.1 of the DAE controller A 118, and the port b 202.2 of the storage node A 112 can be connected to a port "a" 208.1 of the DAE controller B 120. Likewise, the storage node B 114 includes a port "a" 204.1 and a port "b" 204.2 for communicating with the DAE controller A 118 and the DAE controller B 120, respectively. The port a 204.1 of the storage node B 114 can be connected to a port "b" 206.2 of the DAE controller A 118, and the port b 204.2 of the storage node B 114 can be connected to a port "b" 208.2 of the DAE controller B 120. Each of the ports a 202.1, b 202.2, the ports a 204.1, b 204.2, the ports a 206.1, b 206.2, and the ports a 208.1, b 208.2 can incorporate wired or wireless communication methods and components or any other suitable communication media that can allow the DAE controllers A 118, B 120 to communicate in-band with the storage nodes A 112, B 114 or any other component of the HA storage system 104. For example, the ports a 202.1, b 202.2, a 204.1, b 204.2, a 206.1, b 206.2, and a 208.1, b 208.2 can include Ethernet or any other suitable wired connections configured to provide up to 50 gigabytes per second (Gbps) or more bandwidth to the DAE controllers A 118, B 120. As further shown in FIG. 2, the management component 116 can communicate with the DAE controller A 118 over an out-of-band channel 212. Likewise, the management component 116 can communicate with the DAE controller B 120 over an out-of-band channel 214. For example, the out-of-band channels 212, 214 can be implemented as secure shell (SSH) sessions, a network controller sideband interface (NCSI) to a baseboard management controller (BMC) configuration, or any other suitable implementation or configuration. Further, in-band communications between the storage nodes A 112, B 114 and the DAE controllers A 118, B 120 can be via NVMe/SCSI sessions or any other suitable implementation.

During operation, in one embodiment, the management component 116 can receive a notification of an IO error from one of the storage nodes of the storage appliance 108. For example, the IO error can occur subsequent to the storage node issuing, to one of the DAE controllers of the DAE 110, a first write operation to write a data block to an LBA of the storage device 122. In response to the notification of the IO error, the management component 116 can issue, over an out-of-band channel, a flush command to the DAE controller, causing data blocks stored in cache memory of the DAE controller to be written to the storage device 122. In one embodiment, the management component 116 can issue the flush command to a daemon running on the DAE controller. The management component 116 can receive, over the out-of-band channel, an acknowledgement of completion of the flush operation from the DAE controller and send a notification of the completion of the flush operation to the storage node. The storage node can now issue, to the DAE controller of the DAE 110, a second write operation to write a data block to the LBA of the storage device 122, while avoiding a potential race condition involving the first write operation.

Figure 3:
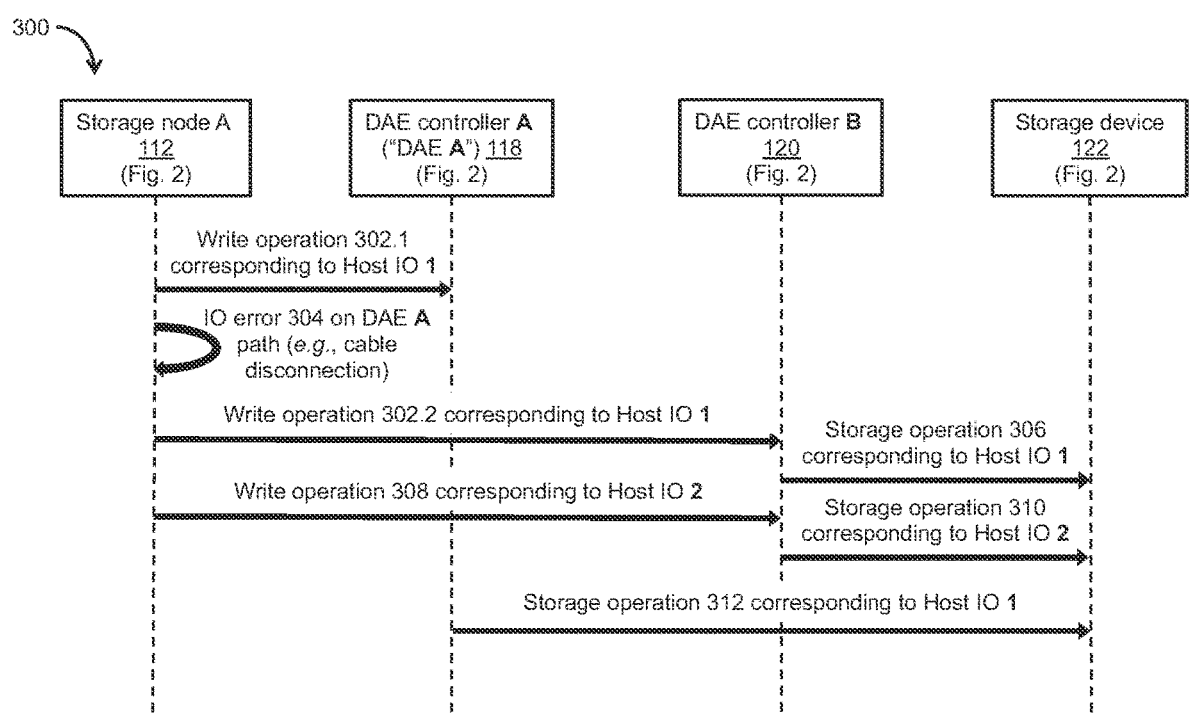
FIG. 3 is a ladder diagram of a first process of performing write operations to the DAE controllers of FIG. 2 by a storage node of FIG. 2, in which the write operations are involved in a potential race condition.
Figure 4:
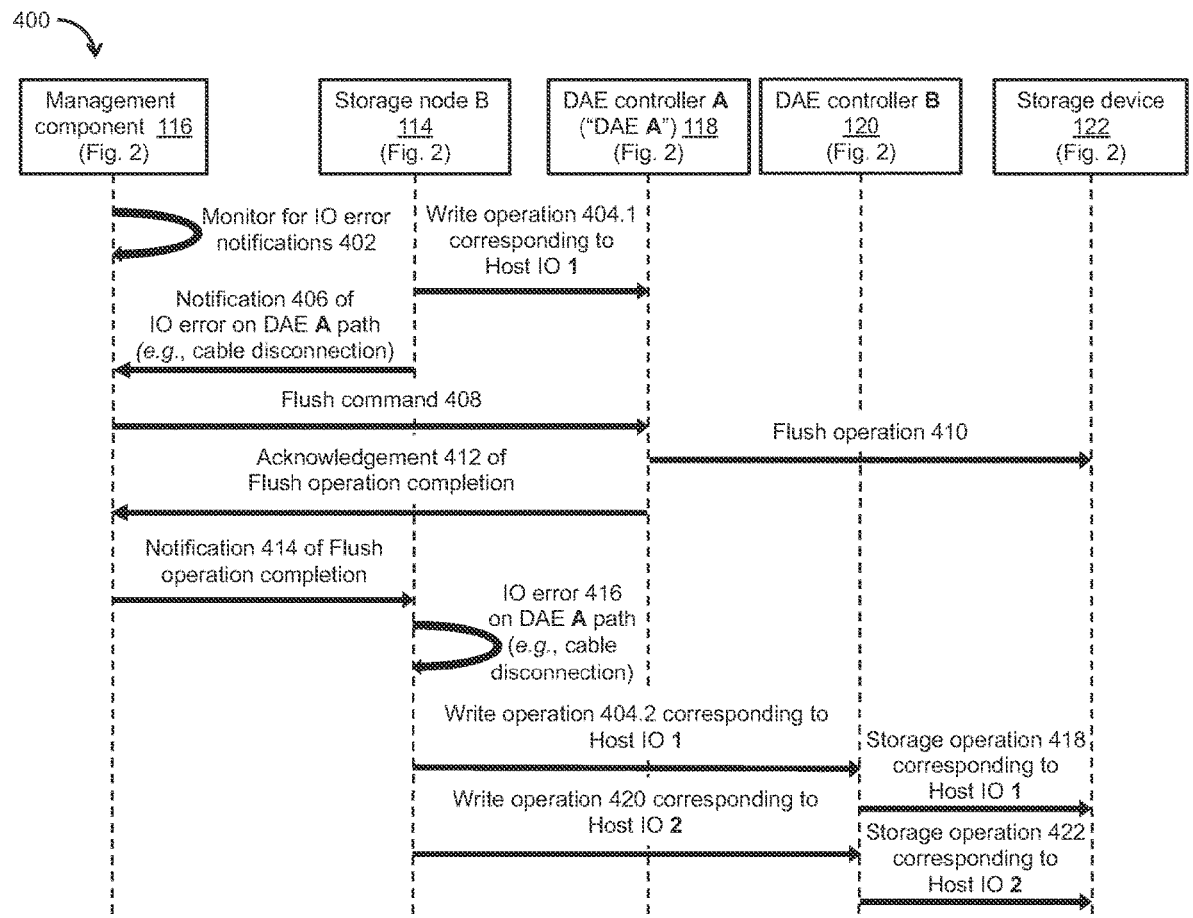
FIG. 4 is a ladder diagram of a second process of performing write operations to the DAE controllers of FIG. 2 by a storage node of FIG. 2, in which a potential race condition involving the write operations is avoided.

The disclosed techniques for avoiding race conditions in high availability (HA) storage systems that employ disk array enclosures (DAEs) will be further understood with reference to the following illustrative examples and FIGS. 2-4. As shown in FIG. 3, a first illustrative example is described herein with reference to a process 300 of performing write operations to the DAE controllers A 118, B 120 (see FIG. 2) by one of the storage nodes A 112, B 114 (e.g., the storage node A 112; see FIG. 2), in which the write operations may be involved in a potential race condition. As shown in FIG. 4, a second illustrative example is described herein with reference to a process 400 of performing write operations to the DAE controllers A 118, B 120 by one of the storage nodes A 112, B 114 (e.g., the storage node B 114; see FIG. 2), in which a potential race condition involving the write operations may be avoided.

In the first illustrative example, the process 300 starts by receiving a first host-generated IO request (referred to herein as the "Host IO 1"; see FIG. 3) at, for example, the storage node A 112, directing the storage node A 112 to write a data block to a logical block address (LBA) of the storage device 122. In this first example, the storage node A 112 employs a plurality of logical layers of the storage node A 112 and the DAE controllers A 118, B 120 to process host-generated IO requests, including an application layer, a namespace layer, a mapping layer, and a physical layer corresponding to the storage device 122. Having received the Host IO 1, the storage node A 112 issues a write operation 302.1 to one of the DAE controllers A 118, B 120, such as the DAE controller A 118, directing the DAE controller A 118 to write the data block to the LBA of the storage device 122. In this first example, after the storage node A 112 has issued the write operation 302.1 to the DAE controller A 118, an HA event occurs on a path to the DAE controller A 118, namely, a cable disconnection, which prevents an acknowledgement of completion of the write operation 302.1 to be returned to the storage node A 112 from the DAE controller A 118. As a result, the storage node A 112 may be unaware of a current state of the write operation 302.1, e.g., whether the write operation 302.1 has been "completed" or is still "in-flight."

In response to the cable disconnection, the mapping layer of the storage node A 112 returns an IO error 304 to the application layer of the storage node A 112. In response to the IO error 304, the storage node A 112 issues a second write operation 302.2 corresponding to the Host IO 1 to the DAE controller B 120, directing the DAE controller B 120 to write the data block to the same LBA of the storage device 122. Having been directed to write the data block to the LBA of the storage device 122, the DAE controller B 120 stores or caches, persistently or at least temporarily, the data block to its cache memory B 121 (see FIG. 2) and performs a storage operation 306 to store the data block at the LBA of the storage device 122. Alternatively, the storage node A 112 may issue a write operation 308 corresponding to a second host-generated IO request (referred to herein as the "Host IO 2"; see FIG. 3) to the DAE controller B 120, directing the DAE controller B 120 to write a different data block to the same LBA of the storage device 122. Having been directed to write the different data block to the LBA of the storage device 122, the DAE controller B 120 stores or caches, persistently or at least temporarily, the different data block to its cache memory B 121 and performs a storage operation 310 to store the different data block at the LBA of the storage device 122.

However, if the first write operation 302.1 corresponding to the Host IO 1 has not been "completed" but is still "in-flight," a race condition may occur involving the write operation 302.1 issued to the DAE controller A 118 and the write operation 302.2 (or the write operation 308) issued to the DAE controller B 120. For example, having been directed by the Host IO 1, prior to the cable disconnection, to write the data block to the LBA of the storage device 122, the DAE controller A 118 may store or cache, persistently or at least temporarily, the data block to its cache memory A 119 (see FIG. 2) and perform a storage operation 312 to store the data block at the LBA of the storage device 122. Unfortunately, however, the first write operation 302.1 (and its corresponding the storage operation 312) to the LBA of the storage device 122 may be completed after the completion of the second write operation 302.2 (and its corresponding the storage operation 306) to the same LBA of the storage device 122, resulting in possible corruption of the data block stored at the LBA. Likewise, the first write operation 302.1 (and its corresponding the storage operation 312) to the LBA of the storage device 122 may be completed after the completion of the write operation 308 (and its corresponding the storage operation 310) to the same LBA of the storage device 122, again resulting in possible corruption of the data block stored at the LBA.

In the second illustrative example, the process 400 can avoid race conditions that may occur in the process 300 by employing one or more out-of-band communication channels (e.g., the out-of-band channels 212, 214; see FIG. 2) to issue or send out-of-band commands (e.g., flush commands) from the management component 116 to the DAE controller A 118 and/or the DAE controller B 120, as appropriate. The process 400 starts with the management component 116 monitoring for notifications 402 of IO errors issued by the storage nodes A 112, B 114. The process 400 continues by receiving a first host-generated IO request (again referred to herein as the "Host IO 1"; see FIG. 4) at, for example, the storage node B 114, directing the storage node B 114 to write a data block to an LBA of the storage device 122. Like the storage node A 112, the storage node B 114 employs a plurality of logical layers of the storage node B 114 and the DAE controllers A 118, B 120 to process host-generated IO requests, including an application layer, a namespace layer, a mapping layer, and a physical layer corresponding to the storage device 122. Having received the Host IO 1, the storage node B 114 issues a write operation 404.1 to one of the DAE controllers A 118, B 120, such as the DAE controller A 118, directing the DAE controller A 118 to write the data block to the LBA of the storage device 122. As in the first example, after the storage node B 114 has issued the write operation 404.1 to the DAE controller A 118, an HA event occurs on the path to the DAE controller A, namely, a cable disconnection, which prevents an acknowledgement of completion of the write operation 404.1 to be returned to the storage node B 114 from the DAE controller A 118. As a result, the storage node B 114 may be unaware of a current state of the write operation 404.1, e.g., whether the write operation 404.1 has been "completed" or is still "in-flight."

However, rather than immediately returning an IO error to the application layer of the storage node B 114 in response to the cable disconnection, the storage node B 114 issues a notification 406 of the IO error (e.g., the cable disconnection) to the management component 116. Further, in response to the notification 406 of the IO error, the management component 116 issues a flush command 408 over an out-of-band communication channel (e.g., the out-of-band channel 212; see FIG. 2) to the DAE controller A 118, causing the DAE controller A 118 to perform a flush operation 410 to write data blocks stored or cached in its cache memory A 119 to the storage device 122. Once the flush operation 410 has been completed, the DAE controller A 118 sends an acknowledgement 412 of the completion of the flush operation 410 to the management component 116, which issues a notification 414 of the completion of the flush operation 410 to the storage node B 114. In response to the notification 414 of the completion of the flush operation 410, the mapping layer of the storage node B 114 returns an IO error 416 to the application layer of the storage node B 114.

In response to the IO error 416, the storage node B 114 issues a second write operation 404.2 corresponding to the Host IO 1 to the DAE controller B 120, directing the DAE controller B 120 to write the data block to the same LBA of the storage device 122. Having been directed to write the data block to the LBA of the storage device 122, the DAE controller B 120 stores or caches, persistently or at least temporarily, the data block to its cache memory B 121 (see FIG. 2) and performs a storage operation 418 to store the data block at the LBA of the storage device 122. Alternatively, the storage node B 114 may issue a write operation 420 corresponding to a second host-generated IO request (again referred to herein as the "Host IO 2"; see FIG. 4) to the DAE controller B 120, directing the DAE controller B 120 to write a different data block to the same LBA of the storage device 122. Having been directed to write the different data block to the LBA of the storage device 122, the DAE controller B 120 stores or caches, persistently or at least temporarily, the different data block to its cache memory B 121 and performs a storage operation 422 to store the different data block at the LBA of the storage device 122. It is noted, however, that because the DAE controller A 118 performed the flush operation 410 before the storage node B 114 issued the second write operation 404.2 (or the write operation 420) to the DAE controller B 120, a race condition involving the first write operation 404.1 and the second write operation 404.2 (or the write operation 420) issued to the DAE controller B 120 may be avoided.

Figure 5:
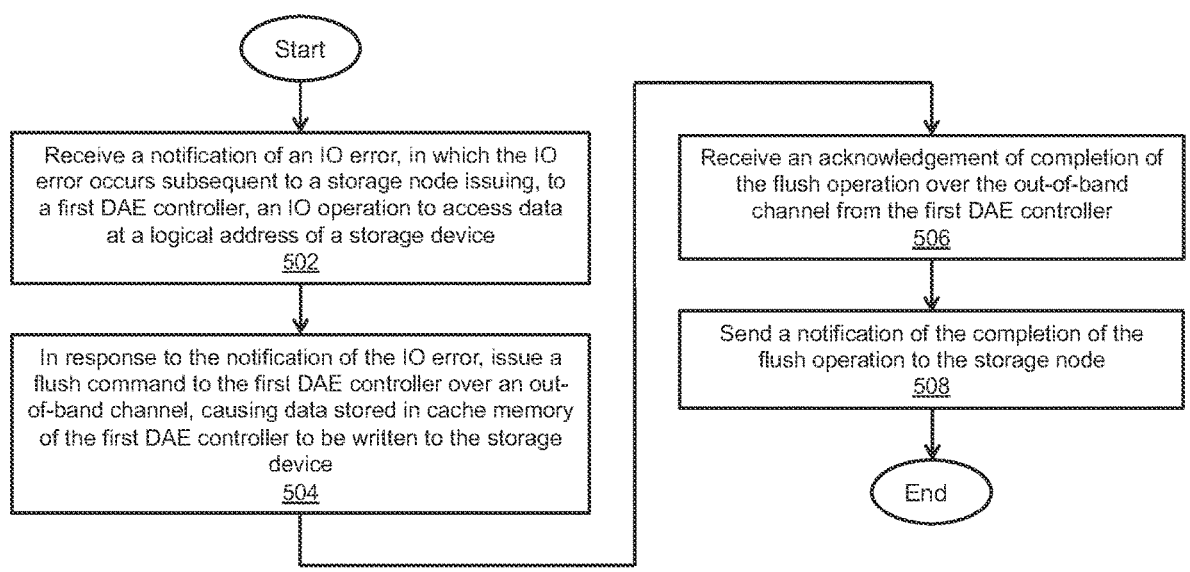
FIG. 5 is a flow diagram of an exemplary method of avoiding race conditions in high availability (HA) storage systems that employ disk array enclosures (DAEs).

An exemplary method of avoiding race conditions in high availability (HA) storage systems that employ disk array enclosures (DAEs) is described below with reference to FIG. 5. As depicted in block 502, a notification of an IO error is received, in which the IO error occurs subsequent to a storage node issuing, to a first DAE controller, an IO operation to access data at a logical address of a storage device. As depicted in block 504, in response to the notification of the IO error, a flush command is issued to the first DAE controller over an out-of-band channel, causing data stored in cache memory of the first DAE controller to be written to the storage device. As depicted in block 506, an acknowledgement of completion of the flush operation is received over the out-of-band channel from the first DAE controller. As depicted in block 508, a notification of the completion of the flush operation is sent to the storage node. The storage node can now issue, to a second DAE controller, a second IO operation to access data at the logical address of the storage device, while avoiding a race condition involving the first IO operation.

Having described the above illustrative embodiments, other alternative embodiments and/or variations can be made and/or practiced. For example, it was described herein with reference to the first and second illustrative examples that after a storage node has issued a write operation to a DAE controller, an HA event may occur on a path to the DAE controller, namely, a cable disconnection, which prevents an acknowledgement of completion of the write operation to be returned to the storage node from the DAE controller. As a result, the storage node may be unaware of a current state of the write operation, e.g., whether the write operation has been "completed" or is still "in-flight." In one or more alternative embodiments, an HA storage system may be faced with different types of HA events such as a reboot of a storage node, an IO timeout, or any other suitable HA event. In the case of a storage node reboot, a notification of the reboot can be provided from the storage node to a management component (e.g., the management component 116; see FIGS. 1 and 2). Further, in response to the notification of the reboot, the management component can issue a flush command over an out-of-band communication channel to at least one DAE controller coupled to the storage node, as appropriate. Once the flush command has been acted upon by the DAE controller, the rebooted storage node can resume issuing IO operations (e.g., write operations) to the DAE controller. In the case of an IO timeout, a notification of the IO timeout can be provided from a DAE controller to the management component. In response to the notification of the IO timeout, the management component can issue a command over an out-of-band communication channel to the DAE controller to take down the corresponding IO session between it and a storage device, as well as issue a flush command over the out-of-band communication channel to the DAE controller. Once these commands have been acted upon by the DAE controller, storage nodes coupled to the DAE controller can resume issuing IO operations (e.g., write operations) to the DAE controller.

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of avoiding race conditions in a high availability (HA) storage system, comprising:
receiving, at a management entity of a storage appliance, a notification of an input/output (IO) error occurring on a communications path that includes a disk array enclosure (DAE) controller of a DAE, the IO error occurring subsequent to a storage node of the storage appliance issuing, to the DAE controller, an IO operation to access data at a logical address of a storage device;
in response to the notification of the IO error, issuing, by the management entity, a flush command over an out-of-band channel to the DAE controller to cause data stored in cache memory of the DAE controller to be written to the storage device;
receiving, at the management entity, an acknowledgement of completion of the flush operation over the out-of-band channel from the DAE controller; and
sending, by the management entity, a notification of the completion of the flush operation to the storage node.

2. The method of claim 1 wherein, in response to the notification of the completion of the flush operation, a second notification of the IO error is returned from a mapping layer of the storage node to an application layer of the storage node.

3. The method of claim 2 wherein, in response to the second notification of the IO error being returned to the application layer of the storage node, a second IO operation is issued by the storage node to a second DAE controller of the DAE to access the data at the logical address of the storage device.

4. A method of avoiding race conditions in a high availability (HA) storage system, comprising:
sending, by a storage node of a storage appliance to a management entity of the storage appliance, a notification of an input/output (IO) error on a communications path that includes a disk array enclosure (DAE) controller of a DAE, the IO error occurring subsequent to the storage node issuing, to the DAE controller, an IO operation to access data at a logical address of a storage device, wherein, in response to the notification of the IO error, a flush command is issued, by the management entity, to the DAE controller over an out-of-band channel to cause data stored in cache memory of the DAE controller to be written to the storage device, and wherein an acknowledgement of completion of the flush operation is received, at the management entity, over the out-of-band channel from the DAE controller;
receiving, at the storage node from the management entity, a notification of the completion of the flush operation; and
in response to the notification of the completion of the flush operation, returning a second notification of the IO error from a mapping layer of the storage node to an application layer of the storage node.

5. The method of claim 4 further comprising:
in response to the second notification of the IO error being returned to the application layer, issuing, by the storage node, a second IO operation to a second DAE controller of the DAE to access the data at the logical address of the storage device.

6. A high availability (HA) storage system, comprising:
a storage appliance including a first storage node, a second storage node, and a management component;
a disk array enclosure (DAE) including a first DAE controller and a second DAE controller; and
a storage device,
wherein the storage appliance is configured to execute the management component to:
receive a notification of an input/output (IO) error occurring on a communications path that includes the first DAE controller, the IO error occurring subsequent to a respective storage node from among the first storage node and second storage node issuing an IO operation to the first DAE controller to access data at a logical address of the storage device;
in response to the notification of the IO error, issue a flush command to the first DAE controller over an out-of-band channel to cause data stored in cache memory of the first DAE controller to be written to the storage device;

receive an acknowledgement of completion of the flush operation over the out-of-band channel from the first DAE controller; and
send a notification of the completion of the flush operation to the respective storage node.

7. The system of claim 6 wherein the respective storage node is configured to issue the IO operation to the first DAE controller to access the data at the logical address of the storage device.

8. The system of claim 6 wherein the respective storage node is configured, in response to the notification of the completion of the flush operation, to return a second notification of the IO error from a mapping layer of the respective storage node to an application layer of the respective storage node.

9. The system of claim 8 wherein the respective storage node is further configured, in response to the second notification of the IO error being returned to the application layer, to issue a second IO operation to the second DAE controller to access the data at the logical address of the storage device.

10. The system of claim 6 wherein the first DAE controller is configured to receive the flush command over the out-of-band channel.

11. The system of claim 10 wherein the first DAE controller is further configured, in response to the flush command, to write the data stored in its cache memory to the storage device.

12. The system of claim 11 wherein the first DAE controller is further configured to send the acknowledgement of the completion of the flush operation over the out-of-band channel to the management controller.

13. The system of claim 6 wherein the storage device is configured as a solid-state drive (SSD).

14. The system of claim 6 wherein the out-of-band channel is configured as a secure shell (SSH) session between the storage appliance and the first DAE controller.

15. The system of claim 6 wherein the IO error corresponds to a cable disconnection between the respective storage node and the first DAE controller.

16. The system of claim 6 wherein the IO error corresponds to a reboot of the respective storage node.

17. The system of claim 6 wherein the first DAE controller and the second DAE controller are configured to communicate with the storage device in an IO session.

18. The system of claim 17 wherein the first DAE controller and the second DAE controller are configured to communicate with the storage device in the IO session using a Non-Volatile Memory express Over Fabrics (NVMeOF) networking protocol.

19. The system of claim 17 wherein the IO error corresponds to an IO timeout error.

20. The system of claim 19 wherein the storage appliance is further configured to execute the management component, in response to receipt of the notification of the IO timeout error, to issue a command over the out-of-band channel to the first DAE controller to take down the IO session between the first DAE controller and the storage device.

* * * * *